US008807873B2

(12) United States Patent
Kiest, Jr.

(10) Patent No.: US 8,807,873 B2
(45) Date of Patent: Aug. 19, 2014

(54) MANHOLE LINER HAVING A WIRELESS DATA TRANSMITTER

(75) Inventor: Larry W. Kiest, Jr., Ottawa, IL (US)

(73) Assignee: LMK Technologies, LLC, Chicago, IL (US)

( * ) Notice: Subject to any disclaimer, the term of this patent is extended or adjusted under 35 U.S.C. 154(b) by 0 days.

(21) Appl. No.: 13/561,854

(22) Filed: Jul. 30, 2012

(65) Prior Publication Data

US 2014/0030026 A1    Jan. 30, 2014

(51) Int. Cl.
*F16L 55/18*    (2006.01)

(52) U.S. Cl.
USPC .............................................. 405/184.2; 52/20

(58) Field of Classification Search
USPC ............. 405/157, 184.1, 184.2; 52/19, 20, 21
See application file for complete search history.

(56) References Cited

U.S. PATENT DOCUMENTS

| 5,520,569 | A  | * | 5/1996  | Endoh ................................ 451/5 |
| 7,484,908 | B2 | * | 2/2009  | Stadler .............................. 52/19 |
| 7,598,858 | B2 |   | 10/2009 | Quist et al. |
| 7,720,570 | B2 |   | 5/2010  | Close et al. |
| 7,777,628 | B2 |   | 8/2010  | Tilson, Jr. |
| 7,836,760 | B2 |   | 11/2010 | Saylor |
| 7,841,366 | B2 | * | 11/2010 | Bryant et al. ............... 405/184.2 |
| 2004/0175235 | A1 | * | 9/2004  | Whittaker et al. .......... 405/184.1 |
| 2009/0038703 | A1 | * | 2/2009  | Smith et al. ................ 405/184.2 |
| 2011/0030875 | A1 |   | 2/2011  | Conte et al. |
| 2011/0186203 | A1 |   | 8/2011  | Lindner et al. |
| 2012/0007714 | A1 |   | 1/2012  | Mühlin |

* cited by examiner

*Primary Examiner* — Frederick L Lagman
(74) *Attorney, Agent, or Firm* — McKee, Voorhees & Sease

(57) ABSTRACT

The present invention provides an apparatus and method for repairing a manhole. The wall of the manhole is lined with a liner to form a new wall. The liner includes a resin that cures to form the new wall that is similar to the repaired wall. Embedded in the liner is a wireless data transfer mechanism that includes a transmitter, such as a radio-frequency identification (RFID). The RFID transmits identification information about the liner or the repaired wall. The transmitter may be capable of data entry in the field or may be otherwise field-programmable and further capable of transmitting at least one physical characteristic. Examples of physical characteristics may include temperature, pressure, chemical reactions, flow within the manhole, and the like. Additional transmitters may be used along the length of the manhole to determine characteristics at multiple locations, with each additional transmitter including the same or different sensors.

20 Claims, 5 Drawing Sheets

MANHOLE LINER HAVING A WIRELESS DATA TRANSMITTER

FIELD OF THE INVENTION

The present invention relates generally to the monitoring and repair of a manhole. More particularly, but not exclusively, the invention relates to a liner assembly for repairing the wall of a manhole that includes a transmitter or transmitters that are capable of transmitting information, such as identification information or physical characteristics of the area around the transmitter.

BACKGROUND OF THE INVENTION

Conventional manholes include a lower or bottom panel, a barrel having a relatively constant diameter adjacent the panel, a concentric or eccentric cone extending upwardly from the barrel, one or more adjusting rings to adjust the overall height of the manhole, and a casting frame on top of the adjusting rings to support an elevation substantially level with the surrounding pavement. The casting frame is preferably sealed to the uppermost adjusting ring to preclude or minimize water flow into the manhole. The cone and adjusting rings are commonly known as the manhole chimney. Most manhole structures are unique in size and shape with varying diameters and depths. In addition, bricks often form a portion of the wall of the manhole.

Substandard construction methods can lead to damage or deterioration of the manhole structure. Thus, the manhole is vulnerable, allowing water and subsidence of soil to enter the manhole, which eventually leads to a structural failure of the manhole.

Prior methods for repairing damaged portions of the walls of manholes include positioning a liner impregnated with a material capable of curing and hardening within the manhole where the damaged portion is located. The liner can extend the full height of the manhole, or can cover only a portion of the height of the manhole. The liner is positioned by lowering or inverting the liner into the manhole. Once the liner is positioned within the manhole, it is pressurized, usually by an inflation bladder, causing the liner to press against the wall of the manhole, and the liner is cured by applying heat, such as steam or hot water. These liners can also be cured at ambient temperatures by chemical mixtures that generate an exothermic reaction, the use of ultraviolet light or other photocuring initiators, or by electron beam curing. The liner forms a new interior wall of the manhole being repaired. Such a process is known as cured-in-place manhole lining.

The repairs of the walls of manholes are oftentimes performed in a large scale, such as for an entire neighborhood or even city. The number of assemblies used to repair the manholes can be great. However, information relating to the repair of the manhole needs to be saved or known. For example, the manholes should have identification, such as by address, manhole identification number, manufacturer information, quality control information, or otherwise. The date of repair and whether there were any special circumstances (increased resin, obstructions, special environment conditions, etc.) in repairing the manhole should also be known. The lining circumstances could determine what can or should be used or done in a manhole in the future. For example, weak spots or the use of additional curing materials may be noted. Labels can be added to the repaired walls designating the repair, but these labels will fade over time, or may even be detached from the wall or location of placing.

Accordingly, there is a need in the art for an improved lining method and apparatus that overcomes the problems resulting from not being able to determine identification properties of a repaired manhole.

SUMMARY OF THE INVENTION

It is therefore a primary object, feature, and/or advantage of the present invention to provide an improved apparatus and method that overcomes the deficiencies in the art.

It is another object, feature, and/or advantage of the present invention to provide an improved method of repairing a manhole that provides for identification properties of the repaired manhole.

It is yet another object, feature, and/or advantage of the present invention to provide an improved method and apparatus for lining a manhole including a liner having a transmitter embedded therein.

It is still another object, feature, and/or advantage of the present invention to provide an improved method and apparatus for repairing a wall of a manhole that provides for the monitoring of physical characteristics within the manhole.

It is still a further object, feature, and/or advantage of the present invention to provide an improved method and apparatus for repairing a wall of a manhole that provides wireless monitoring of the manhole wall repair.

It is still a further object, feature, and/or advantage of the present invention to provide an improved method and apparatus for lining a manhole that provides wireless a data transfer mechanism that is field-programmable or capable of data entry in the field that includes information specific to the manhole liner and repair.

It is yet a further object, feature, and/or advantage of the present invention to provide an improved method and apparatus for repairing a wall of a manhole that provides continuous data of the environment within and around the manhole.

These and/or other objects, features, and advantages of the present invention will be apparent to those skilled in the art. The present invention is not to be limited to or by these objects, features and advantages. No single embodiment need provide each and every object, feature, or advantage.

According to one aspect of the present invention, a method of repairing and identifying a wall of a manhole is provided. The method includes providing a liner assembly comprising a liner impregnated with a material capable of curing and hardening, and including a transmitter capable of transmitting an identification. The liner assembly is positioned within the manhole and pressed against the wall of the manhole. The identification transmitted by the transmitter is received to identify the repaired wall of the manhole. The transmitter may be further capable of transmitting at least one physical characteristic.

According to another aspect of the present invention, a liner assembly for repairing a wall of a manhole is provided. The liner assembly includes a liner comprising a resin impregnable material and a transmitter connected to the liner and capable of transmitting an identification. The transmitter may be further capable of transmitting at least one physical characteristic.

According to another aspect of the present invention, a kit for repairing a wall of a manhole is provided. The kit includes a resin impregnable liner configured to line a wall of a manhole and a transmitter capable of transmitting an identification.

DETAILED DESCRIPTION OF THE PREFERRED EMBODIMENTS

Figure 1:
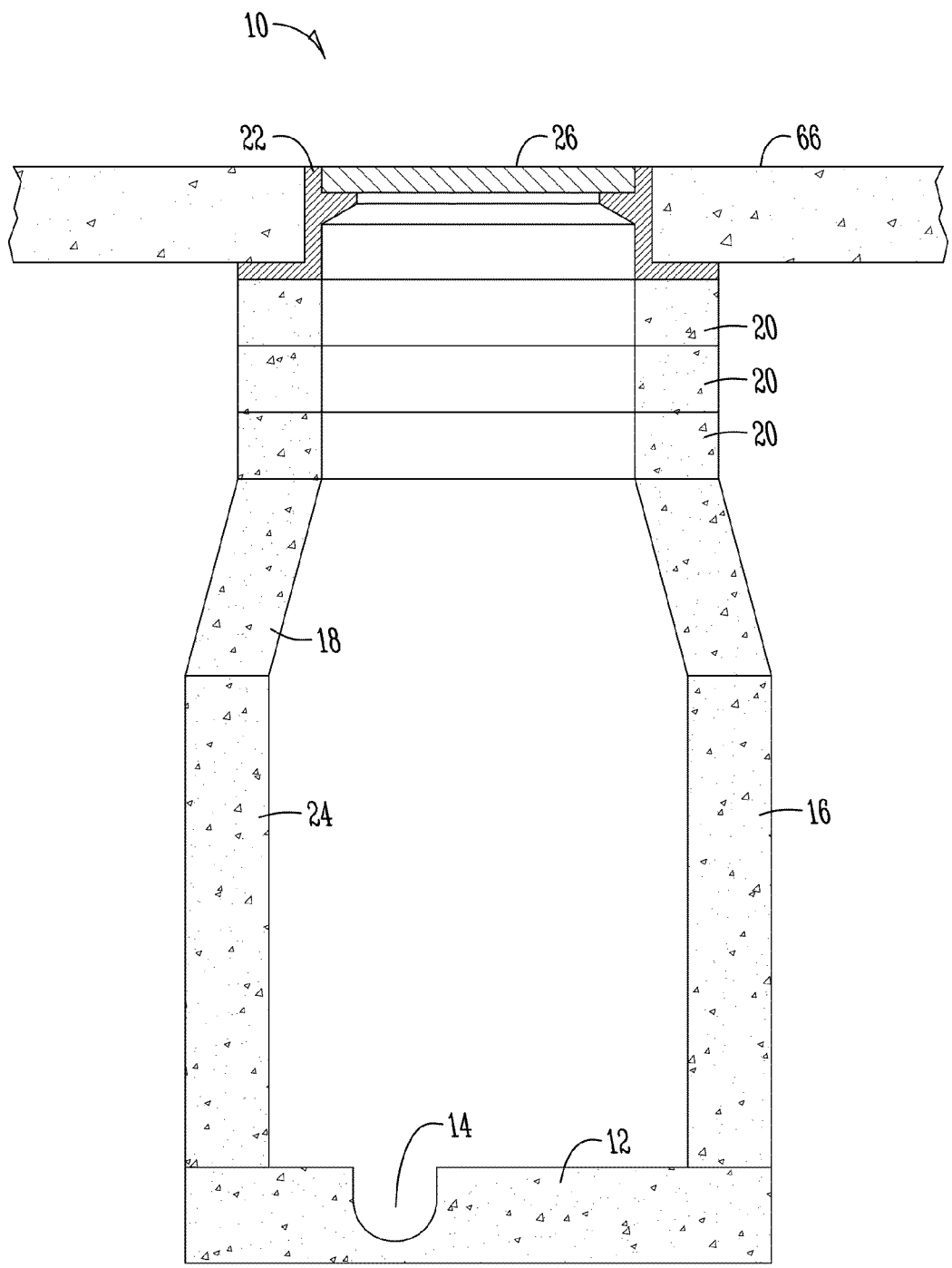
FIG. 1 is a sectional view of an exemplary structure of a manhole.

FIG. 1 is a sectional view of an exemplary structure of a manhole 10. The manhole 10 includes a bottom floor 12, a barrel 16 above the bottom floor 12, a cone 18 supported by the barrel 16, and a plurality of adjusting rings 20 supported by the cone 18. A casting frame 22 resides upon the upper most ring 20 and supports a lid 26. The casting 22 is normally sealed to the top ring 20. It is understood that one or more rings 20 may be used to adjust the height of the manhole 10 such that the lid 26 is substantially at the level of the pavement 66 surrounding the manhole 10. In addition, while FIG. 1 shows the cone 18 to have a concentric shape, it is understood that an eccentric cone can be utilized such that the manhole 10 has an asymmetrical cross-sectional appearance. FIG. 1 also shows an optional run through 14 in the bottom floor 12. While each manhole generally has unique size and shape, it is generally understood that the basic construction of the manhole 10 is similar in all manholes. Manholes generally are narrower at the top section, or chimney, than at the bottom section. Additionally, it is not uncommon for bricks to form the wall of a manhole.

Figure 2:
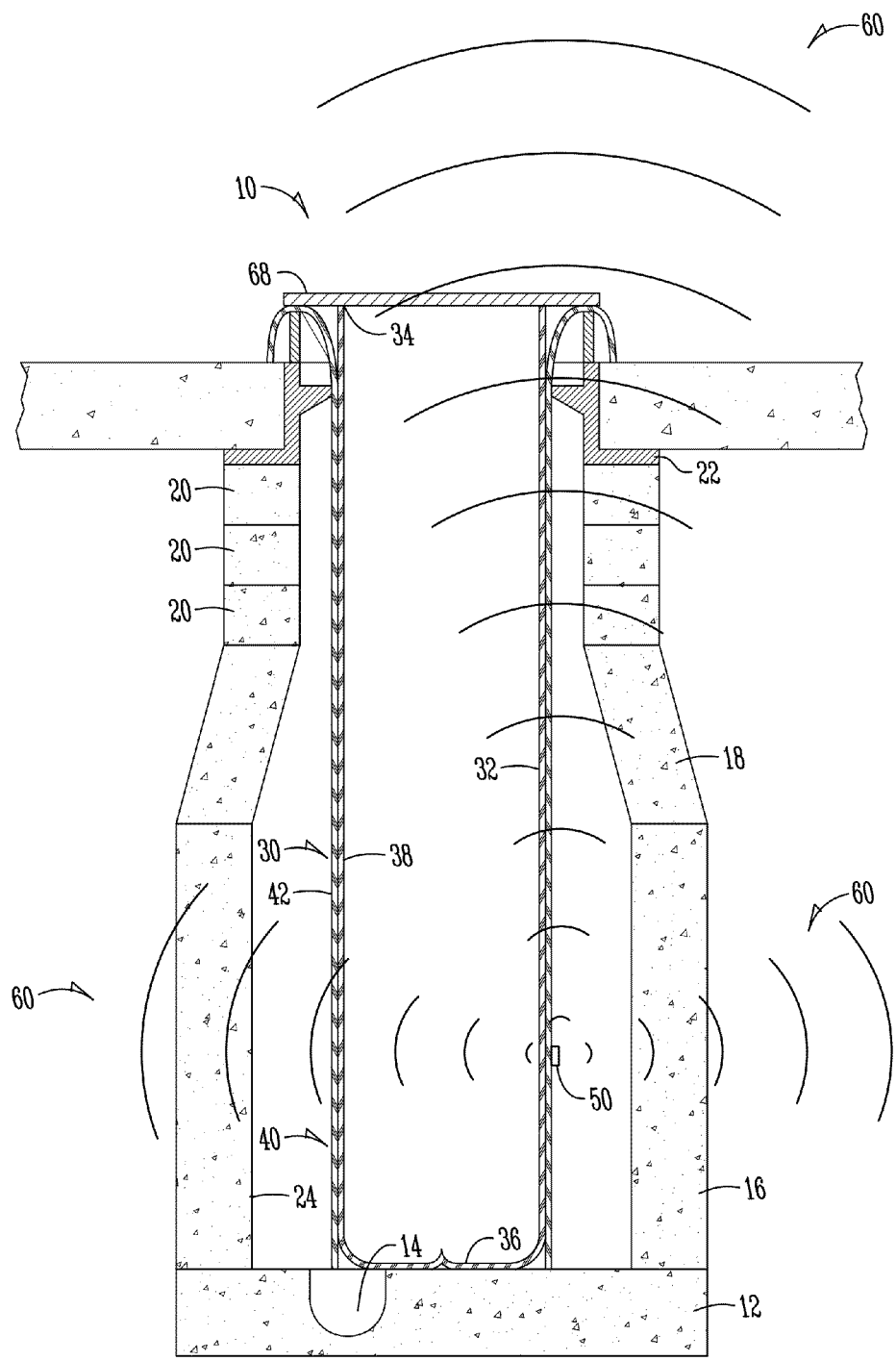
FIG. 2 is a sectional view of the manhole of FIG. 1 being lined with the liner assembly according to the present invention.

FIG. 2 is a sectional view of a liner assembly 30 of the present invention positioned in a manhole 10. The liner assembly 30 includes a bladder 32, a manhole liner 40, and a transmitter 50 connected to the manhole liner 40. The bladder 32 comprises a first end 34 near the opening of the manhole 10, a second end 36 positioned at the bottom of the manhole 10, and a bladder body 38 therebetween. The first end 34 of the bladder 32 may be attached to a base outside of the manhole 10. The diameter of the bladder 32 is shown to be less than or equal to the smallest diameter of the manhole 10. The bladder body 38 is stretchable such that it is able to press against a wall of the manhole 10 when expanded. However, a bladder 32 that is sized to the varying diameters of the manhole 10 may also be used with the present invention. Alternatively, a bladder may not be required to practice this invention when a manhole liner having an impermeable coating is used. The manhole liner 40 is attached at the opening of the manhole, and comprises a manhole liner body 42 that at least partially surrounds the bladder body 38 in the manhole 10.

The manhole liner body 42 is comprised of a resin absorbent material, and may or may not include a resin impervious coating or layer such as polyurethane, PVC, or similar coatings having an elastic characteristic. The manhole liner 40 may be constructed by forming a tubular sleeve including a fabric material which can be stretched circumferentially up to 150% of its non-stretched diameter. The tubular sleeve may have substantially no longitudinal stretching characteristics along its length. The manhole liner 40 may be constructed to a generic size or diameter that accommodates most manhole diameters. The manhole liner 40 may have a significant length which can be cut to the appropriate length at the manhole site. Additionally, the manhole liner 40 may be sized to provide a lining to both the manhole wall 24 and the bottom floor 12.

The manhole liner 40 is impregnated with a resinous material, which may be a thermoset resin that saturates the liner and cures and hardens quicker in the presence of heat. The resinous material may be a single component or multi-component epoxy, a vinyl ester, or a polyester resin. The resinous material may also be a resin formulated to cure under ambient conditions, under the application of heat, or upon the application of light or radiation (such as a UV cure). However, it should be appreciated that other resinous materials may be used, on the condition that they are able to cure and harden.

The transmitter 50 is connected to the manhole liner 40 on either side of the manhole liner body 42. Furthermore, when the manhole liner 40 comprises multiple layers, the transmitter 50 may be housed between the layers of the liner. The transmitter 50 includes at least a radio frequency identification tag (RFID tag 52) for containing identification properties of the manhole, liner, location (address), date, and the like. The RFID tag will provide identification for the manhole, such as the date and time of repair, the address of the location of the manhole, or other identifying features of the manhole repair. Thus, the RFID tag 52 of the transmitter 50 can be used to provide information related to the repair of the manhole.

Figure 3:
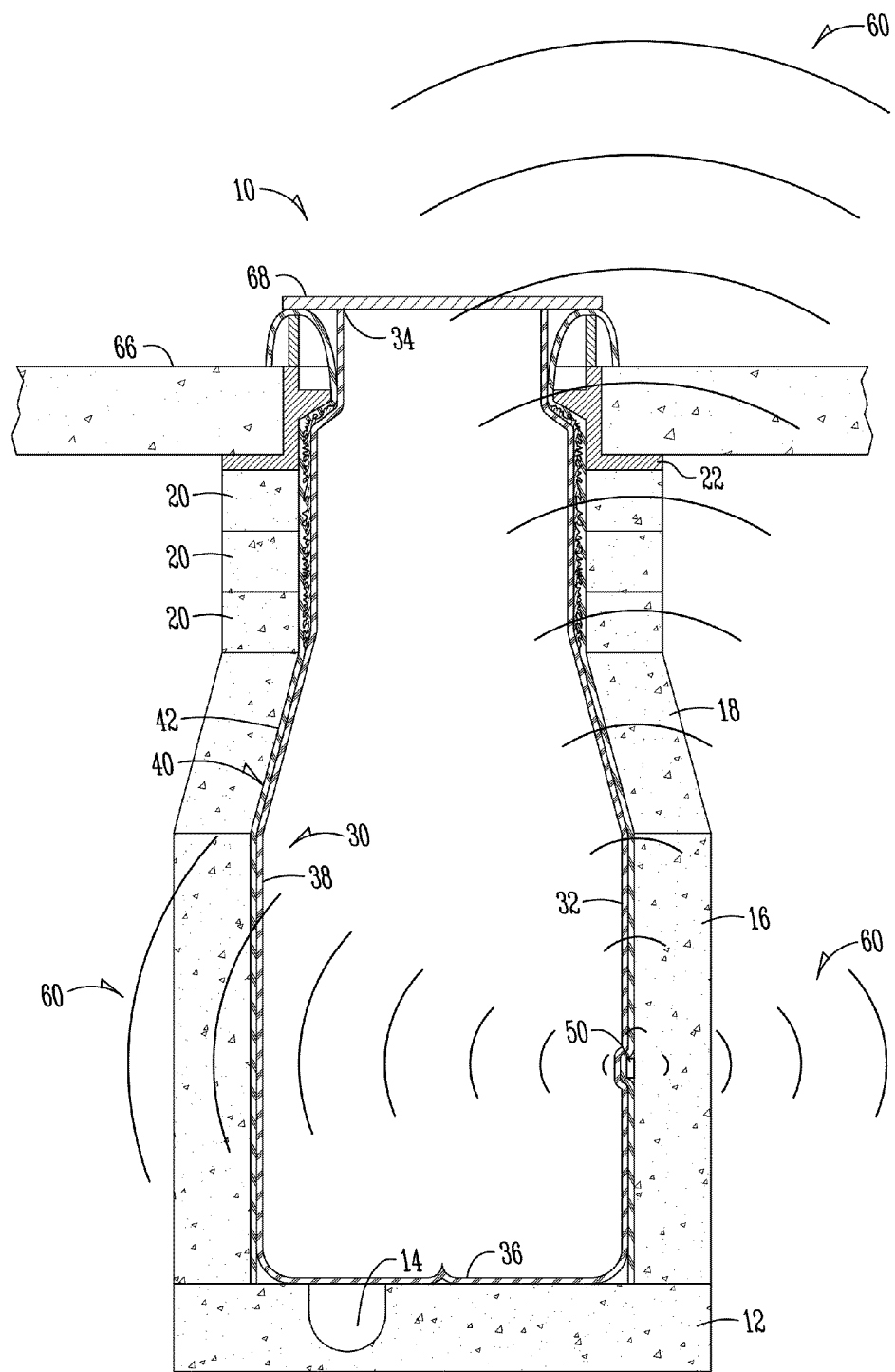
FIG. 3 is another sectional view of the manhole of FIG. 1 being repaired with the liner assembly according to the present invention.

FIG. 3 is a sectional view similar to FIG. 2 showing bladder 32 fully inflated in the manhole 10. Means and methods of inflation are described in U.S. Pat. No. 7,670,086 and U.S. patent application Ser. Nos. 12/959,044; 12/834,589; and 12/943,394, hereby incorporated by reference in their entireties, whereby the bladder 32 is inflated with fluid pressure (not shown), such as air, introduced to the cavity of the bladder body 38 through inflation device 68. The increased pressure causes the bladder body 38 to expand circumferentially towards the manhole wall 24. The expanded bladder 32 will press the manhole liner 40 against the wall 24 of the manhole 10. Furthermore, as shown in FIG. 3, the transmitter 50 is positioned between the manhole liner 40 and the manhole wall 24. However, as mentioned above, the transmitter 50 may also be positioned on the interior of the liner, or between layers of the liner. Alternatively, a portion of the transmitter may be attached to the manhole liner such that a sensing element may access the interior of the manhole after installation. As such, a portion of the transmitter having the sensing element may extend into the interior of the manhole. Another configuration includes where the transmitter lies beneath a portion of the cured manhole liner, such as a clear polymeric film, to allow the sensing element to obtain a reading within the manhole. Such configurations are advantageous when a sensor is used to measure a physical characteristic within the manhole after installation of the liner, such as liquid flow or humidity.

Figure 4:
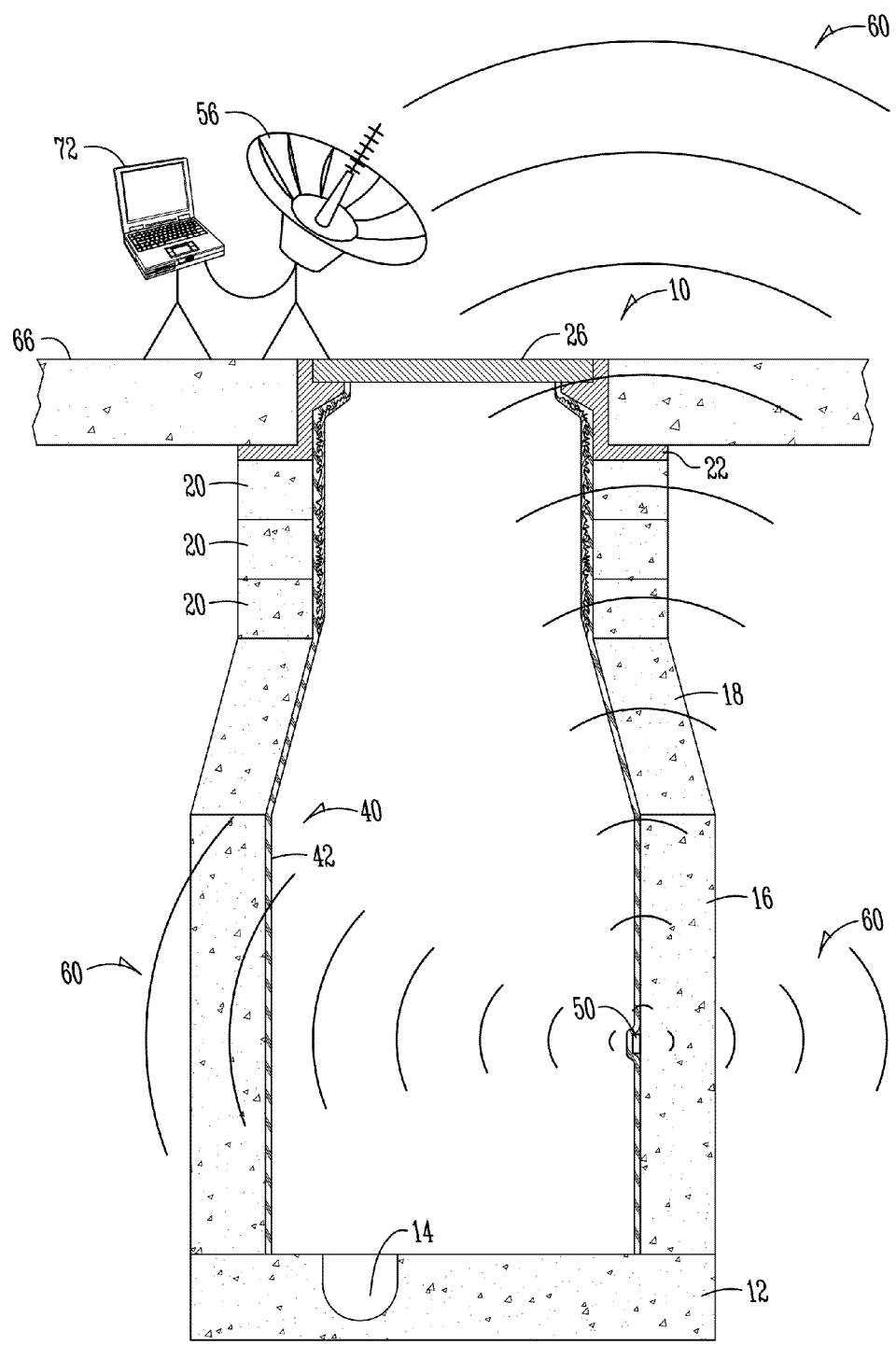
FIG. 4 is a sectional view of the manhole of FIG. 1 after it has been repaired according to the present invention.

FIG. 4 is a sectional view of the manhole 10 after the resinous material has cured and hardened and the bladder 32 has been removed from the manhole 10. The bladder 32 may be removed by deflating the fluid from the cavity, and then by pulling a rope (not shown) connected to the second end 36 of the bladder 32. Pulling the bladder 32 out by the bottom first causes the bladder 32 to peel away from the cured manhole liner 40. Thus, the bladder 32 may have a frangible connection to the manhole liner 40 such that the bladder 32 is easily detached from the liner and peeled away until the bladder 32 is fully removed from the liner. Although peeling the bladder requires the least amount of effort, it should be appreciated that the bladder 32 may also be pulled straight out of the manhole 10 from the first end 34 of the bladder 32 as well. Alternatively, the material for the bladder may be compatible for adhesion to the manhole liner, and remain within the manhole to act as a smooth interior surface of the manhole after curing.

After the manhole lid 26 is replaced on the casting frame 22 of the manhole 10, what remains is a manhole having a repaired and structurally renewed wall. As is shown in FIG. 4, the transmitter 50 will remain in the manhole 10 after the bladder 32 has been removed. The transmitter 50 is used to store and transmit information related to the repair of the manhole 10. Thus, a receiver 56 may be used at a later time to receive a signal from the transmitter 50 to identify the address or identifying number of the manhole, the date of repair, the type of materials used in the repair, manufacturer information, quality control information, and any other circumstances that may have come up related to the repair of the manhole.

Also shown in FIGS. 2-4 is a signal 60 being emitted by the transmitter 50. The embodiment shown in the figures shows an active transmitter 50 that transmits a signal 60 outwardly from the transmitter 50. A receiver 56 having a viewer 72 picks up the signal 60. The receiver 56 of FIG. 4 is shown at a location outside of the manhole 10 and above the ground. Therefore, a receiver 56 may be moved over the ground until it picks up a signal 60 from a transmitter 50. The receiver 56 can then interpret the information contained in the signal 60 to determine the identification characteristics emitted by the transmitter 50.

Figure 5:
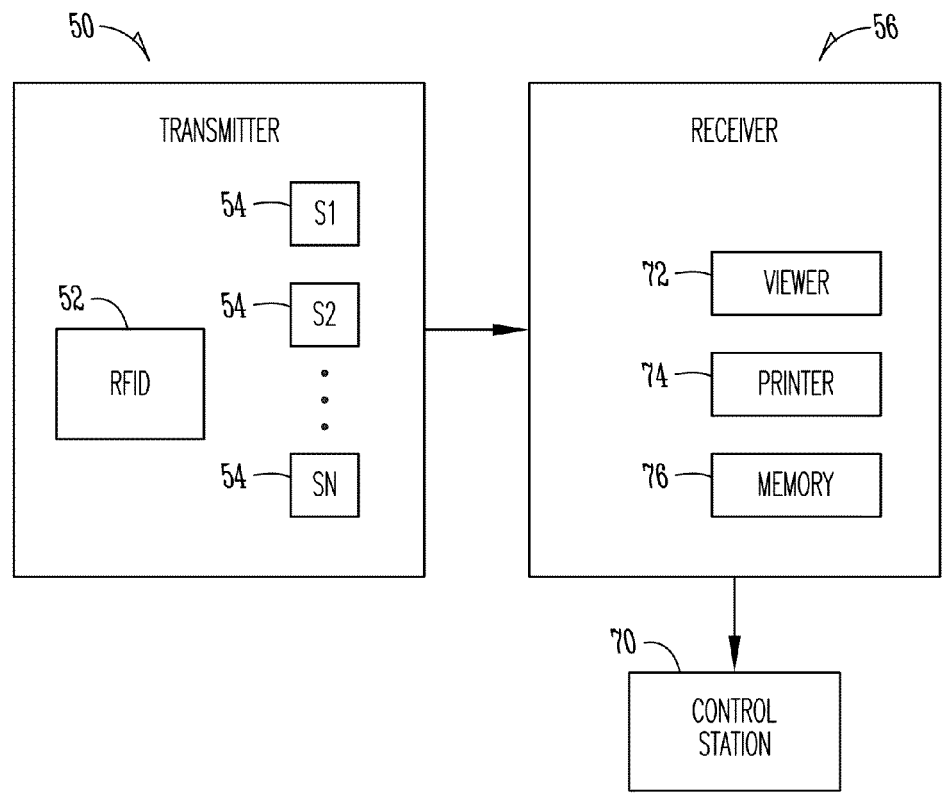
FIG. 5 is a block diagram of a transmitter system used with the present invention.

FIG. 5 is a block diagram showing a configuration of the transmitter 50 and receiver 56. As mentioned above, the transmitter 50 includes an RFID tag 52 and may include at least one sensor 54 for determining physical characteristics within the manhole 10. The sensor 54 could be a pressure sensor, a sensor for measuring distance, a load cell, a temperature sensor, a strain gauge, an accelerometer, a flow meter, a chemical sensor, or the like. Furthermore, as is shown in FIG. 5, the transmitter 50 may include a plurality of sensors 54 or a sensor array. Thus, the transmitter 50 could include the RFID tag 52 along with any number of sensors 54 as may be desired for the particular manhole repair and other characteristics.

As mentioned above, the RFID tags 52 or transmitters may be passive or active. Furthermore, the transmitter 50 could operate on radio frequencies or other wireless data transfer systems (as non-limiting examples, hypersonic or infrared systems). When a passive RFID tag is used, a power source, shown as receiver, must be inserted into the manhole 10 to read the information. This is because passive RFID tags operate by using the radio energy transmitted by the receiver as its energy source or to activate an onboard battery. However, when aggressive or active RFID tags 52 are used, a receiver 56 could be positioned further away from the transmitter 50, potentially even above ground. This is the example shown in FIG. 2, and is due to the fact that aggressive transmitters constantly emit a signal or transmission, whether weak or strong, and this signal is read by a receiver 56. Alternatively, the transmitter 50 may need no power at all, or may be self powered by the medium in which it is placed (as a non-limiting example, flowing water).

The RFID tag 52 or other wireless data transfer system may be capable of data entry in the field or may be otherwise field-programmable. Such a feature may be included with the transmitter 50 by configuring an interface for a physical link (such as a port for a cable) directly to memory within the RFID tag 52 for data entry or by including a programmable device, such as an integrated circuit or a field-programmable gate array, within the transmitter 50. Transmitter 50 may further include a receiver (not shown) configured for wireless data entry and programming. It should also be noted that the inclusion of a field-programmable gate array will also allow for reprogramming of a single sensor to run several different tests. These features will provide several advantages in manhole lining applications. A first advantage includes the flexibility of allowing an installation crew to enter the date and time of pipe repair, the name of construction team who repaired the pipe, the address and/or location of the manhole, and the like. Secondly, since a variety of conditions exist in the field, operators may wish to include a summary of the obstacles encountered during installation with an RFID tag. Such information will certainly be useful for successfully completing subsequent repair work. A third advantage is that the ability to enter data or program the device in the field decreases the manufacturing cost associated with the manhole liner and RFID tag.

The receiver 56 is a device or application having the capability of receiving the information transmitted via wireless communication or telemetry by the transmitter 50. For RFID tags 52, an RFID reader may be a one-way radio receiver that reads the data being transmitted by the RFID transmitter. Alternatively, an RFID reader may be considered an interrogator. An interrogator is a two-way radio transmitter-receiver that sends a signal to the RFID transmitter and reads the response. The receivers 56 may transmit the collected data to a computer system running RFID software or RFID middleware. This is shown in FIG. 5. The receiver 56 may include the computer system or also may send it via a line or wirelessly to a computer system. The computer system may include a viewer 72, such as a monitor. The monitor may include information such as the temperature within the manhole, the pressure or force on the manhole liner, or other information transmitted by the transmitter 50. The information may be displayed on the monitor or viewer 72 in any number of ways. For example, the monitor may include a graph with the temperature along the Y-axis and a time along the X-axis such that the graph can show any change in temperature and to ensure that temperature range maintains within the range needed for the material impregnated in the manhole to cure and harden. Thus, any dip or spike in temperature can be observed via a control station, and an operator may have the opportunity to adjust the temperature within the manhole. The other sensors may also include graphs or other monitoring characteristics. The receiver 56 may also include a printer 74 and a source of memory 76. The printer 74 can be used to print out the graph or physical characteristics as they are being determined such that an operator can take the printed material to study it at a later time. The printed material may be useful to build up a catalog of conditions. For example, if it is known that the operator is repairing a manhole under a certain condition, such a particular ambient temperature, the operator can take the printed material received from the sensors in the manhole liner to track the ambient temperatures. Therefore, the next time a manhole is to be repaired under the same condition, the operator will already have the information cataloged provide relevant data, and thus, the operator can plan accordingly.

Additionally, the receiver 56 may include a source of memory 76, which may be permanent or removable from the receiver 56. The memory 76 will work similar to the printed material. Thus, an operator can take the saved information from the transmitter 50, including the identification from the RFID tag 52, and the physical characteristics determined by the sensors 54, and save that information to evaluate later or to create a database. As with the printed material, the database could be used to aid any future repairs with similar physical characteristics.

FIG. 5 also shows a control station 70 operatively connected to the receiver 56 and transmitter 50. The control station 70 can include controls, such as controls for expanding the bladder and pressing the liner assembly against the manhole wall. Thus, the control station 70 may include controls for air or other fluid pressure, temperature, etc. Once the control station 70 has received information from the transmitter 50 and receiver 56, the control station 70 can be configured to automatically adjust one or more of the controls accordingly. For example, if the temperature within the manhole has dropped below a curing temperature of the material used to cure and harden, the control station 70 can activate a heating element or other means to increase the temperature within the bladder and/or liner. Once the temperature has risen to a proper range for curing, the control station 70 receives a command from the receiver 56 to stop increasing the heat within the manhole.

While certain identification properties as well as certain and specific physical characteristics have been discussed in relation to the RFID tags and sensors, it should be appreciate that the present invention includes generally any physical characteristic and identification property that may be useful for the repair of manholes. The invention is not to be limited to those specifically mentioned.

It should be understood that various changes and modifications to the embodiments described here would be apparent to those skilled in the art. Such changes and modifications may be made without departing from the spirit and scope of the present invention and without diminishing its intended advantages. It is, therefore, intended that such changes and modifications be covered by the appended claims.

What is claimed is:

1. A method of repairing and identifying a wall of a manhole, comprising:
   providing a liner assembly comprising a manhole liner impregnated with a material capable of curing and hardening, and including a transmitter capable of transmitting an identification;
   positioning the liner assembly within the manhole;
   pressing the manhole liner against the wall of the manhole; and
   wirelessly receiving the identification transmitted from the transmitter by a receiver at a location outside of the manhole after the liner has cured and hardened within the manhole and the manhole has been closed and while the transmitter remains in the manhole.

2. The method of claim 1 further comprising positioning a bladder within the liner assembly.

3. The method of claim 2 wherein pressing the manhole liner against the wall of the manhole comprises expanding the bladder within the liner assembly.

4. The method of claim 1 wherein the transmitter is also capable of transmitting at least one physical characteristic.

5. The method of claim 4 further comprising receiving another physical characteristic transmitted by the transmitter simultaneously with pressing the manhole liner against the wall of the manhole.

6. The method of claim 5 further comprising adjusting conditions within the liner assembly based on the received identification and physical characteristic from the transmitter.

7. The method of claim 6 wherein the physical characteristic comprises temperature, pressure, or velocity of the liner.

8. The method of claim 1 wherein the transmitter operates on radio frequencies, hypersonic transmissions, or infrared transmissions.

9. The method of claim 1 further comprising viewing the received identification on a screen remote from the manhole.

10. The method of claim 1 wherein the liner assembly includes a plurality of transmitters positioned along the length of the manhole liner.

11. The method of claim 1 wherein the identification includes an address, date, type of material used, or any special circumstances.

12. The method of claim 1, wherein the transmitter is field-programmable or capable of data entry in the field.

13. The method of claim 1, wherein the manhole liner is a tubular sleeve capable of being stretched circumferentially up to 150% of its non-stretched diameter.

14. A liner assembly for repairing a wall of a manhole, comprising:
   a manhole liner comprising a resin impregnable material;
   a transmitter connected to the manhole liner and capable of transmitting an identification;
   wherein the transmitter is configured to wirelessly transmit the identification outside of the repaired manhole after the liner has cured and hardened within the manhole and the manhole has been closed and while the transmitter remains in the manhole; and
   a receiver positioned outside of the manhole for wirelessly receiving the identification transmitted from the transmitter at a location outside of the manhole after the liner has cured and hardened within the manhole and the manhole has been closed and while the transmitter remains in the manhole.

15. The liner assembly of claim 14, wherein the manhole liner is a tubular sleeve capable of being stretched circumferentially up to 150% of its non-stretched diameter.

16. The liner assembly of claim 14 wherein the transmitter comprises a radio-frequency identification transponder.

17. The liner assembly of claim 16 wherein the transmitter further comprises at least one sensor comprising a temperature sensor, pressure sensor, strain gauge, flow meter, or chemical sensor.

18. The liner assembly of claim 14 wherein the manhole liner comprises a layer of resin absorbent material and a layer of resin impervious material, and wherein the transmitter is positioned at the layer of resin absorbent material.

19. The liner assembly of claim 14 further comprising a plurality of transmitters connected to the manhole liner.

20. A kit for repairing a wall of a manhole, comprising:
   a resin impregnable liner configured to line a wall of a manhole;
   a transmitter capable of transmitting an identification; and
   a receiver for wirelessly receiving the identification transmitted by the transmitter after the manhole has been closed;
   wherein the transmitter is configured to wirelessly transmit the identification to a location outside of a repaired manhole after the liner has cured and hardened within the manhole and the manhole has been closed and while the transmitter remains in the manhole.

\* \* \* \* \*